US012022397B2

(12) United States Patent
Martin

(10) Patent No.: US 12,022,397 B2
(45) Date of Patent: Jun. 25, 2024

(54) TERMINAL DEVICE, INFRASTRUCTURE EQUIPMENT, WIRELESS TELECOMMUNICATIONS NETWORK, METHODS AND INTEGRATED CIRCUITRY

(71) Applicant: Sony Group Corporation, Tokyo (JP)

(72) Inventor: Brian Alexander Martin, Surrey (GB)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/145,101

(22) Filed: Dec. 22, 2022

(65) Prior Publication Data
US 2023/0128738 A1 Apr. 27, 2023

Related U.S. Application Data

(63) Continuation of application No. 17/176,141, filed on Feb. 15, 2021, now Pat. No. 11,540,220, which is a
(Continued)

(30) Foreign Application Priority Data

Apr. 1, 2016 (EP) ..................................... 16163493

(51) Int. Cl.
*H04W 52/02* (2009.01)
*H04W 36/30* (2009.01)
*H04W 36/38* (2009.01)
*H04W 40/24* (2009.01)
*H04W 76/15* (2018.01)
*H04W 76/27* (2018.01)
*H04W 76/28* (2018.01)
*H04W 88/06* (2009.01)

(52) U.S. Cl.
CPC ....... *H04W 52/0251* (2013.01); *H04W 36/30* (2013.01); *H04W 36/38* (2013.01);
(Continued)

(58) Field of Classification Search
CPC ... H04W 36/30; H04W 36/38; H04W 40/248; H04W 52/0251; H04W 76/15;
(Continued)

(56) References Cited

U.S. PATENT DOCUMENTS

2013/0028069 A1 1/2013 Pelletier et al.
2014/0169255 A1 6/2014 Zhang et al.
(Continued)

FOREIGN PATENT DOCUMENTS

EP 2747490 A1 * 6/2014 ............ H04W 48/20
EP 2747490 A1 6/2014

OTHER PUBLICATIONS

Samsung, "Text Proposal on RACH based Small data transmission", R2-132735, 3GPP TSG RAN WG2 Meeting #83, Barcelona, Spain, Aug. 19-23, 2013. (Year: 2013).*
(Continued)

*Primary Examiner* — Khoa Huynh
(74) *Attorney, Agent, or Firm* — XSENSUS LLP

(57) ABSTRACT

A terminal device for use with a wireless telecommunications network, the terminal device including a transceiver; and a controller configured to control the transceiver to exchange data with the wireless telecommunications network using one of a first communications service and a second communications service, the first communications service being associated with a first quality of service for exchanging data and the second communications service being associated with a second quality of service for exchanging data. The controller is configured to control the transceiver to establish one of a first set of radio connection states with the wireless telecommunications network and one of a second set of radio connection states with the wireless telecommunications network, and control the transceiver to establish the radio connection state of the first communications service independently of the radio connection state of the second communications service.

19 Claims, 4 Drawing Sheets

Related U.S. Application Data continuation of application No. 16/089,188, filed as application No. PCT/EP2017/054998 on Mar. 3, 2017, now Pat. No. 10,925,002.

(52) U.S. Cl.
CPC ......... *H04W 40/248* (2013.01); *H04W 76/15* (2018.02); *H04W 76/27* (2018.02); *H04W 76/28* (2018.02); *H04W 88/06* (2013.01); *Y02D 30/70* (2020.08)

(58) Field of Classification Search
CPC ..... H04W 76/27; H04W 76/28; H04W 88/06; Y02D 30/70; Y02D 70/1242; Y02D 70/1262; Y02D 70/24
See application file for complete search history.

(56) References Cited

U.S. PATENT DOCUMENTS

| | | | |
|---|---|---|---|
| 2015/0109979 A1* | 4/2015 | Miklos ................. | H04W 76/28 370/311 |
| 2017/0164349 A1* | 6/2017 | Zhu ....................... | H04W 72/51 |

OTHER PUBLICATIONS

Ericsson White Paper, Uen 284 23-3244, "5G Systems: Enabling Industry and Society Transformation," Jan. 2015, pp. 1-24.

Holma, H. and Toskala, A., "LTE for UMTS: OFDMA and SC-FDMA Based Radio Access," First published: Mar. 31, 2009, Copyright © 2009 John Wiley & Sons, Ltd., Print ISBN: 9780470994016, pp. 1-8.

Huawei, Hisilicon, "Motivation for new WI on Light Connection in LTE" RP-160301, 3GPP TSG RAN Meeting #71, Göteborg, Sweden, Mar. 7-11, 2016, pp. 1-14.

Huawel, Intel Corporation, China Telecom, "New WI proposal: Signalling reduction to enable light connection for LTE," RP-160540, 3GPP TSG RAN Meeting #71, Gothenburg, Sweden, Mar. 7-10, 2016, pp. 1-7.

Intel Corporation, "Further enhancements on signalling reduction to enable light connection for LTE," RP-160425, 3GPP TSG RAN Meeting #71, Gothenburg, Sweden. Mar. 7-10, 2016, pp. 1-7.

NTT Docomo, "New SID Proposal: Study on New Radio Access Technology," RP-160671, 3GPP TSG RAN Meeting #71, Göteborg, Sweden, Mar. 7-10, 2016, pp. 1-7.

International Search Report and Written Opinion for International Application No. PCT/EP2017/054998 dated May 18, 2017.

\* cited by examiner

TERMINAL DEVICE, INFRASTRUCTURE EQUIPMENT, WIRELESS TELECOMMUNICATIONS NETWORK, METHODS AND INTEGRATED CIRCUITRY

CROSS-REFERENCE TO RELATED APPLICATIONS

This application is a continuation of U.S. patent application Ser. No. 17/176,141, filed Feb. 15, 2021, which is a continuation of U.S. patent application Ser. No. 16/089,188, filed Sep. 27, 2018 (now U.S. Pat. No. 10,925,002), which is a National Stage Entry of International Patent Application No. PCT/EP2017/054998, filed Mar. 3, 2017, and claims priority to European patent application 16163493.6, filed Apr. 1, 2016, the entire contents of each of which are being incorporated herein by reference.

TECHNICAL FIELD OF THE DISCLOSURE

The present disclosure relates to a terminal device, infrastructure equipment, wireless telecommunications network, methods and integrated circuitry.

BACKGROUND OF THE DISCLOSURE

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

With current mobile telecommunications systems, such as those based on the 3GPP defined Universal Mobile Telecommunications System (UMTS) or Long Term Evolution (LTE) architecture, the requirements for different types of scenario, service and use-case can differ significantly. For example, higher bitrate services such as those required for enhanced Mobile BroadBand (eMBB) typically require wider channel bandwidth, while lower bitrate services operate more efficiently within a narrower bandwidth. Furthermore, constant data transfer typically requires an ongoing connection with the network and tight mobility requirements in order to provide higher data rate and faster latency, while more spurious data with extended periods of inactivity typically means that the UE enters a discontinuous recpetion (DRX) state or an idle state in order to conserve power. However transitions between such states results in an additional signalling overhead. Such an issue has been recognised in the approved work item [1] which aims to reduce this signalling overhead by enabling a connected mode which uses UE-centric mobility (cell reselection). Typically, however, there is always a trade-off between latency, throughput, and power consumption, meaning there is no one approach that is suitable for all types of service. Devices supporting multiple services may therefore need to use various approaches.

There is thus a need to manage the different approaches required for each service supported by a particular device, each service having its own characteristics and requirements. This is particularly the case for upcoming 5$^{th}$ generation (5G) mobile telecommunications systems [2], which are expected to support a wider variety of services than current mobile telecommunications systems such as LTE.

SUMMARY OF THE DISCLOSURE

In one embodiment, the present technique provides a terminal device for use with a wireless telecommunications network, the terminal device comprising: a transceiver; and a controller configured to control the transceiver to exchange data with the wireless telecommunications network using one of a first communications service and a second communications service, the first communications service being associated with a first quality of service for exchanging data and the second communications service being associated with a second quality of service for exchanging data; wherein the controller is configured to control the transceiver to establish one of a first set of radio connection states with the wireless telecommunications network, each radio connection state of the first set of radio connection states defining a mode of the first communications service comprising one or more of transmitting data to, receiving data from or managing an attachment of the terminal device to the wireless telecommunications network in accordance with the first quality of service; and the controller is configured to control the transceiver to establish one of a second set of radio connection states with the wireless telecommunications network, each radio connection state of the second set of radio connection states defining a mode of the second communications service comprising one or more of transmitting data to, receiving data from or managing an attachment of the terminal device to the wireless telecommunications network in accordance with the second quality of service; wherein the controller is configured to control the transceiver to establish the radio connection state of the first communications service independently of the radio connection state of the second communications service.

In another embodiment, the present technique provides infrastructure equipment for use with a wireless telecommunications network, the infrastructure equipment comprising: a transceiver; and a controller configured to control the transceiver to exchange data with a terminal device of the wireless telecommunications network using one of a first communications service and a second communications service, the first communications service being associated with a first quality of service for exchanging data and the second communications service being associated with a second quality of service for exchanging data; wherein the controller is configured to control the transceiver to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service; and the controller is configured to control the transceiver to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service; wherein the controller is configured to control the transceiver to establish the radio connection state of the first communications service independently of the radio connection state of the second communications service.

In another embodiment, the present technique provides a wireless telecommunications network comprising: a terminal device; a plurality of network nodes each configured to exchange data with the terminal device; and a controller configured to control one or more of the network nodes to exchange data with the terminal device using one of a first communications service and a second communications service, the first communications service being associated with a first quality of service for exchanging data and the second communications service being associated with a second quality of service for exchanging data; wherein the controller is configured to control a first one of the one or more network nodes to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service; and the controller is configured to control a second one of the one or more network nodes to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service; wherein the controller is configured to control the first network node to establish the radio connection state of the first communications service independently of the establishment of the radio connection state of the second communications service by the second network node.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Figure 1:
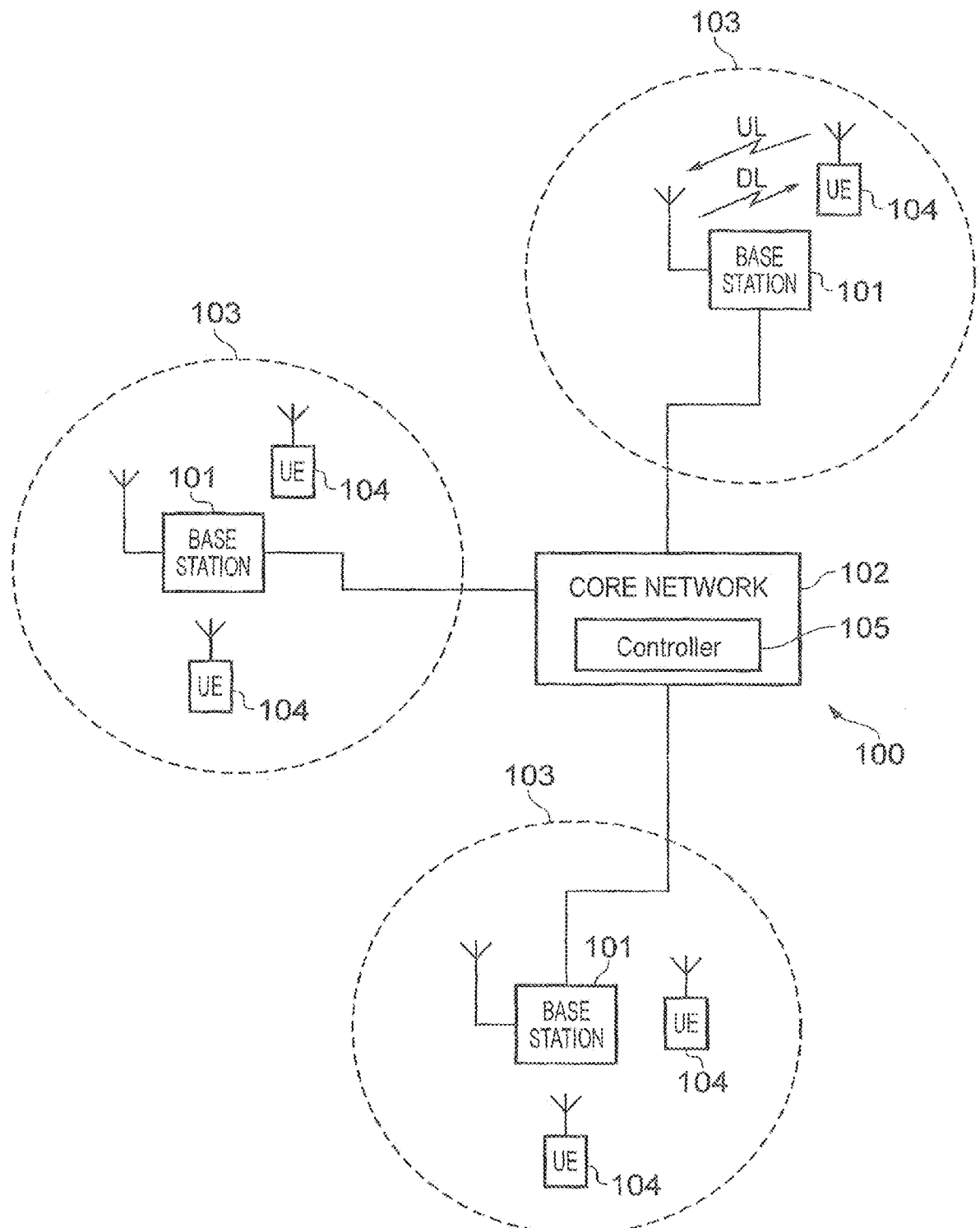
FIG. 1 provides a schematic diagram illustrating some basic functionality of a mobile telecommunications network/system.

FIG. 1 provides a schematic diagram illustrating some basic functionality of a mobile telecommunications network/system 100 which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [3]. It will be appreciated that operational aspects of the telecommunications network which are not specifically described below may be implemented in accordance with any known techniques, for example according to the relevant standards.

The network 100 includes a plurality of base stations 101 connected to a core network 102. A base station 101 is an example of a network node which provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using time and/or frequency radio resources that are licensed for exclusive use by the operator of the network 100. The core network 102 routes data to and from the communications devices 104 via the respective base stations 101 and provides functions such as authentication, mobility management, charging and so on. Such functions of the core network are provided by the controller 105. A communications device may also be referred to as a mobile station, user equipment (UE), user device, mobile radio, terminal device and so forth. A base station may also be referred to as a transceiver station, infrastructure equipment and so forth.

Figure 2:
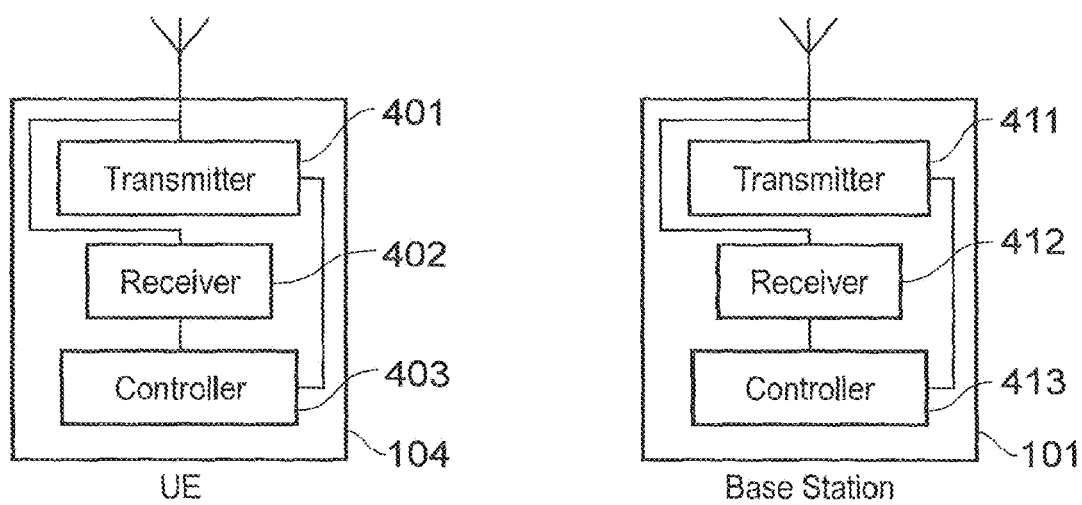
FIG. 2 provides an example schematic block diagram of a terminal device and infrastructure equipment.

FIG. 2 provides an example schematic block diagram of a terminal device or UE 104 and a infrastructure equipment or base station 101. As shown in FIG. 2, the UE 104 includes a transmitter 401 and a receiver 402 (which together form a transceiver) which are controlled by a controller 403. Correspondingly, the base station 101 includes a transmitter 411 and a receiver 412 (which together form a transceiver) which are controlled by a controller 413 (which can also implement a scheduler function). As explained above, the UE 104 transmits and receives signals to and from the base station 101 via a wireless access interface provided by the base station as part of the wireless communications network.

In an embodiment of the present technique, instead of radio connection states (each radio connection state being defined, for example, by one or more of a radio resource connection (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state) being selected on a terminal device basis (as occurs with LTE, for example), each radio connection state is selected on a communications service basis. This enables different handling of different communications services on a single terminal device. Each communications service (service) may be a bearer service, for example. In an embodiment, some services may be set up as "connectionless" or "idle mode" services in order to transmit small data directly from an idle mode (this being similar to the control plane (C-plane) solution for LTE NarrowB and Internet of Things (NB-IoT), for example), while other services are higher rate "connected mode" services used for a more typical packet switched service (similar to a regular LTE service, for example). Furthermore, connected mode services may consider separate inactivity timers to transition, respectively, to a semi-idle or idle state individually (similar to RRC suspend/resume in LTE Rel-13 or "light connection" in LTE Rel-14, for example). Mobility may also be handled separately per service rather than per device. Thus, for example, some services may involve automatic reselection to the best usable cell via an operation carried out by the UE, while others services may involve using network controlled handover.

In an embodiment, different services may be associated with different cells or, more generally, different network nodes (a network node being, for example, a base station or relay node) or different network slices (a network slice being a logical collection of network functions for supporting a particular service with particular requirements).

Thus, a terminal device is no longer considered to be in a particular radio connection state (such as connected or idle mode, for example), but rather, handling of radio connection states is carried out per service. It is thus possible to have separate services in a single UE, each service being associated with a separate sets of one or more radio connection states. In an embodiment, each service may even be served by a different radio access technology (RAT) (for example, one service may use LTE, another service may use 5G and another service may use NB-IoT simultaneously in a single terminal device) or by a different network slice within the same RAT.

In an embodiment, connected mode type services might rely on a common control plane being connected (via an RRC connection) in order to function correctly. In this case, an implicit release of all connected mode services may take place upon releasing the common control plane, while idle mode type services work independently of whether there is a connection for the common control plane. Multiple control planes may still be set up, however, in order to support a specific user-plane service.

In an embodiment, the possible radio connection states for each service may resemble a state machine for each service. For example, the state machine may be similar to that for a UE in UMTS or LTE. So, the possible radio connection states for a particular service would include multiple different RRC states, including at least an idle and a connected state, and potentially one or more intermediate (semi-connected or semi-idle) states. In the context of the present technique, a connected radio connection state is a state in which a radio resource control (RRC) connection is established with the network and the terminal device mobility handling arrangement comprises using a network node handover operation carried out by the network. An idle radio connection state is a state in which no RRC connection is established with the network and the terminal device mobility handling arrangement comprises using a network node reselection operation. A semi-connected (or semi-idle) radio connection state is a state in which an RRC connection is established with the network, but the terminal device mobility handling arrangement comprises using a network node reselection operation.

In an embodiment, three main types of service are considered. These are:

1) High Data Rate/Throughput or Ultra Reliable/Low Latency Service

This is similar to, for example, a regular LTE service, such as internet data transfer, video streaming or voice call. This type of service requires a continuous connection (for example, a continues RRC connection) and continuous/near-continuous transfer of data between the UE and network. It may also require very low latency and/or high reliability. Examples of such services include mission critical services, industrial automation or remote surgery.

2) Infrequent Small Data

This is similar to, for example, an Internet of Things (IoT) type of application, whereby small amounts of data are transferred infrequently, with the time between transmissions in the order or minutes, hours, or days. This type of service is appropriate for smart electricity or gas meters, for example, and may operate via a NB-IoT or similar radio access technology.

3) Regular Small/Intermediate Data

An example of this type of service is web browsing or use of a connected mobile application such as Facebook®. In this case, the amount of data transferred is relatively small compared to downloading a large file or streaming video (as in (1)) however this occurs relatively frequently compared to IoT applications (as in (2)).

It will thus be appreciated that of the three main types of service, (1) has the highest rate of data transfer, followed by (3) with the next highest rate of data transfer, following by (2) with the lowest rate of data transfer.

Each of the above service types have been shown to operate more efficiently using different RRC state, DRX, and mobility handling.

In an embodiment, for providing a service with the characteristics of (1), an arrangement similar to that of, for example, LTE Release-8 may be used. The UE is either idle or connected, and while connected, mobility is controlled by the network in order to provide service continuity and to minimise interruption on handover, and latency is relatively fast when new data is sent or received. The DRX parameters are set so that the DRX cycle is relatively short, and inactivity times are set such that the UE is able to react fairly quickly. For ultra-low latency, it is possible there will be a trade-off in DRX settings in order to prioritise latency over power consumption. The UE will remain connected (via an RRC connection, for example) until release or until the service has ended. Using the above-mentioned terminology, it will thus be appreciated that a radio connection state for providing service (1) may be selected from a set of radio connection states comprising a connected radio connection state and an idle radio connection state.

In an embodiment, for providing a service with the characteristics of (3), an arrangement similar to that of, for example, UMTS (in which there are intermediate states between idle and connected states, these being CELL_PCH and CELL_FACH) or that described in [1] (relating to LTE Release-14) may be used. Here, it is expected that the UE will be able to transition to an intermediate state in which the UE remains connected (via an RRC connection, for example) but uses UE based mobility (rather than network controlled handover). This reduces the signalling for transitioning between idle and connected modes (since there are now multiple steps between idle mode and connected mode which do not require a change in the mobility management of the UE) and also allows more power to be saved. There is a latency trade-off, and it is less responsive than staying fully connected (as in (1)). However there is an improvement compared to frequent changing between idle and connected mode. Using the above-mentioned terminology, it will thus be appreciated that a radio connection state for providing service (3) may be selected from a set of radio connection states comprising a semi-connected radio connection state.

In an embodiment, for providing a service with the characteristics of (2), an arrangement similar to that of, for example, NB-IoT may be used. In this case, a UE in idle mode is able to transmit small amounts of data directly on uplink shared/common channels without having to be fully connected (that is, for example, an RRC connection is not required for transmission of these small amounts of data). This reduces power consumption and signalling. However, it has the longest latency. Using the above-mentioned terminology, it will thus be appreciated that a radio connection state for providing service (2) may be selected from a set of radio connection states comprising an idle radio connection state.

Figure 3:
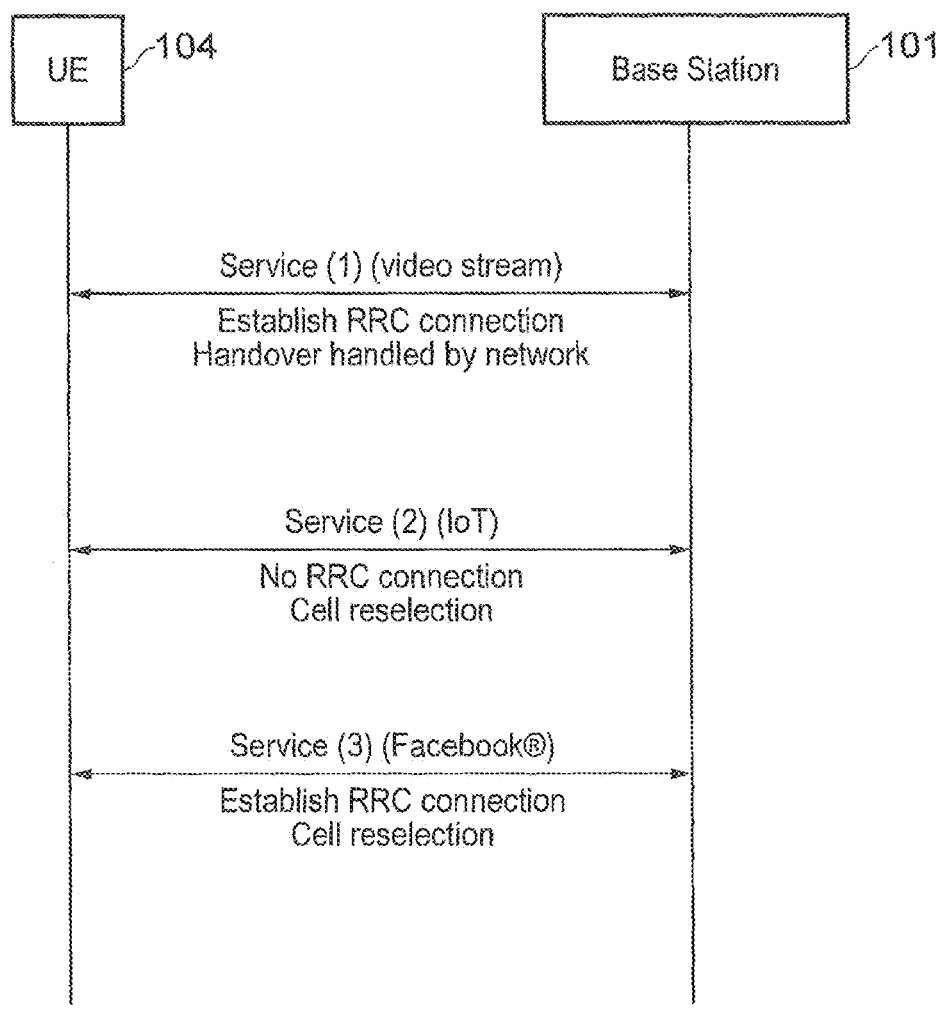
FIG. 3 schematically illustrates three separate communications services via which data is exchanged between the terminal device and infrastructure equipment, according to an embodiment of the present technique.

To be clear, each of these services may be provided simultaneously to a single terminal device, as has been described above. Multiple ones of the arrangements described above may therefore be implemented by a single terminal device simultaneously so as to allow the terminal device to efficiently manage the exchange of data between the terminal device and network for each different type of service. Such an arrangement, according to an embodiment, is illustrated in FIG. 3, which schematically illustrates the three separate communications services (service (1), service (2) and service (3)) via which data is exchanged between the UE 104 and base station 101 and certain characteristics associated with the radio connection state used for providing those services. In particular, for service (1) (for providing a video stream, for example), the current radio connection state is a connected radio connection state (with an RRC connection established and mobility handled by network handover), for service (2) (for providing an IoT service, for example), the current radio connection state is an idle radio connection state (with no RRC connection and mobility handled by cell reselection), and for service (3) (for providing Facebook® updates, for example), the current radio connection state is a semi-connected radio connection state (with an RRC connection established and mobility handled by cell reselection).

In more detail, in an embodiment, each of one or more types of service is respectively associated with one or more sets of radio connection states. Each set of radio connection states comprises one or more radio connection states, and each radio connection state is defined, for example, by one or more of a radio resource connection (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state. The radio connection state is determined for each service individually in a single terminal device.

If, for example, an IoT service (2) is set up, then, once established, this operates in an idle (or "stateless") mode regardless of the state of any other services supported by the UE. So, for example, a UE might be connected (via an RRC connection, for example) for exchanging data with the network using other services, or might be idle with respect to these other service, but the IoT service will nonetheless allow the UE to transmit data to the network without performing any additional connection establishment (such as establishment of an RRC connection, for example). The service would, by default, automatically select the best cell according to idle mode reselection rules (these may include interaction with other services—this is described later on). This may operate in a similar manner to C-plane optimisation for NB-IoT, for example. That is to say, the service would operate such that the UE is able to directly transmit data from idle mode, without performing a full connection establishment and authentication/ciphering (security) setup (in this case, any security would be performed at the upper layers of radio access configuration).

If, for example, a streaming or download type service (1) is set up, then this will be independently connected or released, regardless of the state of other services used by the UE. With respect to this service (1), measurements and measurement reporting according to a connected mode method may be set up, and handover performed as per a connected mode.

If, for example, a regular small data service (3) is set up, then the set of radio connection states will be based on the intermediate state behaviour. For example, the set of radio connection states associated with this service may allow the UE may be connected (via an RRC connection, for example) for short time periods, whilst at times of inactivity, the UE will perform DRX with a longer DRX cycle and will use cell reselection (rather than network controlled handover) so as to reduce network signalling and UE power consumption.

In one embodiment, the UE will handle all services totally independently. However, in another embodiment, efficiency may be improved by allowing some level of interaction between services.

For example, if there is control-plane (C-plane) and user-plane (U-plane) separation, then it may be beneficial to have a common C-plane which handles the setup and establishes a single connection (such as an RRC connection, for example) between the UE and network for use by all services having one or more radio connection states requiring a connection to the network. Thus, once a C-plane connection has been set up for one service, then this may be used for subsequent U-plane services requiring a connection to the network. In an embodiment, upon release of the common C-plane connection, all connected mode U-plane connections established via the common C-plane are released. Also, in an embodiment, upon release of the last remaining U-plane connection, the C-plane connection is released.

In an embodiment, in order to manage UE mobility, services that are configured to operate in idle mode with UE based mobility (reselection), may use the same serving cell that has been configured for a connected mode service. In this case, the cell reselection may, for example, use the same serving cell as a connected mode service when the UE is connected to the network to use such a service, but the UE may then switch to an autonomous reselection mode if there are no connected mode services. It is also possible for each service to be totally independent in terms of UE mobility. In this case, the UE and/or network may select amongst an independent set of cells or network slices for each service. It is also envisaged that mobility may be simplified, for example, by using an uplink measurement based scheme such as that described in the applicant's European patent application EP 15173562.8. In such a scheme, the UE transmits a beacon signal to the network, and the network is configured to perform a network node reselection operation in accordance with a measured characteristic of the beacon signal (such as signal strength or signal quality) indicative of radio channel conditions between the terminal device and one or more network nodes of the network. When used in combination with the present technique, the mobility can be handled entirely by the network. In particular, such a scheme allows the network to select the serving cell independently for each service, and thus, at the UE side, only the bearer handling for each service (for example, connected/idle, security state, channel configurations) needs to be separately managed.

In an embodiment, the UE is provided with one or more DRX configurations (each defined by a set of DRX parameters) associated with each respective one of the one or more services, and the DRX configuration in use depends on the active services and/or the current radio connection state of each active service. If the UE comprises only a single transceiver, then some inter-dependency may be necessary in order to ensure that the chosen DRX configuration is suitable for all active services. For example, it may be the case that the DRX configuration of the active service with the shortest length DRX cycle is always used, thus helping to ensure that the ability of higher data rate active service to exchange data are is not compromised. This is because, if a higher data rate service (such as service (1)) is active, then it is likely that a longer DRX cycle associated with a lower data rate service (such as service (2) or (3)) which is also active is not suitable for the required data exchange rate of the higher data rate service. Upon release of the higher data rater service, however, the UE may start to use a DRX configuration with a longer DRX cycle associated with the next highest data rate active service in order to save power. In an embodiment, the DRX configuration used at any one time may be optimised depending on the various DRX parameters of each active service and/or radio connection state of each active service. As a specific example, a longer DRX cycle activated after a period of inactivity of service type (1) might be longer than the DRX length associated with a type (3) service. In this case, the UE might use the service type (3) DRX (so that service type (3) may continue to exchange data successfully). Alternatively, the UE might apply DRX settings associated with service type (1) until service type (1) is released, and then revert to another configuration for an ongoing type (3) service. In other words, the UE selects between multiple DRX configurations depending on the active services and/or the radio connection state of each active service. In an embodiment.

It will be appreciated that, in the above-described embodiments, whenever it is said that the UE transmits or receives data or signals, it is actually the transceiver 401, 402 of the UE 104 which transmits or receives the data or signals, under the control of the controller 403. Similarly, whenever it is said that the network transmits or receives data or signals, it is actually, a transceiver of a network node (such as the transceiver 411, 412 of base station 101) which transmits or receives the data or signals, under the control of one or more of a controller of the network node (such as controller 413 of base station 101) or the core network controller 105. Furthermore, it will be appreciated that any other described operation said to be carried out by the UE or network is, in reality, carried out by one or more of controller 403 of the UE 104, a controller of a network node (such as controller 413 of base station 101) and core network controller 105.

It will thus be appreciated that the present technique provides a terminal device or UE 104 for use with a wireless telecommunications network 100. The terminal device comprises a transceiver 401, 402 and a controller 403. The controller is configured to control the transceiver to exchange data with the wireless telecommunications network using one of a first communications service and a second communications service. Each of the first and second communication services may be one of the above-described services types (1), (2) or (3), for example. More generally, the first communications service is associated with a first quality of service for exchanging data with the wireless telecommunications network and the second communications service is associated with a second quality of service for exchanging data with the wireless telecommunications service. It will be appreciated that the term quality of service (for example, Quality of Service (QoS) in LTE) relates generally to the type of data exchange that takes place and the required communication characteristics that allow that type of data exchange to take place successfully. Quality of service may take into account communication characteristics such as error rates, bit rate, throughput, transmission delay, availability and jitter, for example. In general, for higher data exchange rates (such as service (1), described above), a higher quality of service will be required, whereas for lower exchange rates (such as service (2)), a lower quality of service will be required.

The controller is configured to control the transceiver to establish one of a first set of radio connection states with the wireless telecommunications network, each radio connection state of the first set of radio connection states defining a mode of the first communications service comprising one or more of transmitting data to, receiving data from or managing an attachment of the terminal device to the wireless telecommunications network in accordance with the first quality of service. The controller is also configured to control the transceiver to establish one of a second set of radio connection states with the wireless telecommunications network, each radio connection state of the second set of radio connection states defining a mode of the second communications service comprising one or more of transmitting data to, receiving data from or managing an attachment of the terminal device to the wireless telecommunications network in accordance with the second quality of service. The controller is configured to control the transceiver to establish the radio connection state of the first communications service independently of the radio connection state of the second communications service. As has been explained, this allows the respective radio connection state of each service simultaneously used by a UE to be chosen independently.

In an embodiment, each radio connection state in the first set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state. These are determined in accordance with the first quality of service (that is, so that the communication characteristics meet those required for the first quality of service). Furthermore, each radio connection state in the second set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state. These are determined in accordance with the second quality of service (that is, so that the communication characteristics meet those required for the second quality of service)

In an embodiment, each radio connection state in the first and second sets of radio connection states is one of a connected radio connection state, an idle radio connection state and a semi-connected radio connection state. A connected radio connection state is a state in which a radio resource control (RRC) connection is established with the wireless telecommunications network and the terminal device mobility handling arrangement comprises using a network node handover operation carried out by the wireless telecommunications network. An idle radio connection state is a state in which no RRC connection is established with the wireless telecommunications network and the terminal device mobility handling arrangement comprises using a network node reselection operation. A semi-connected radio connection state is a state in which an RRC connection is established with the wireless telecommunications network and the terminal device mobility handling arrangement comprises using a network node reselection operation.

In an embodiment, the network node reselection operation of one or more of the idle radio connection state and semi-connected radio connection state is carried out by the controller 403. In another embodiment, the controller 403 is configured to control the transceiver 401, 402 to transmit a beacon signal to the wireless telecommunications network, and the wireless telecommunications network is configured to perform the network node reselection operation of one or more of the idle radio connection state and semi-connected radio connection state in accordance with a measured characteristic of the beacon signal indicative of radio channel conditions between the terminal device and one or more network nodes of the wireless telecommunications network. The measured characteristic of the beacon signal may be signal strength or signal quality, for example.

In an embodiment, each of the first and second sets of radio connection states comprises one of a connected radio connection state and a semi-connected radio connection state, and the controller 403 is configured to control the transceiver to establish a common control plane with the wireless telecommunications network for controlling both the one of the connected or semi-connected radio connection state of the first set of radio connection states and the one of the connected or semi-connected radio connection state of the second set of radio connection states.

In an embodiment, the first set of radio connection states comprises a connected radio connection state and the second set of radio connection states comprises one of a semi-connected or idle radio connection state. The controller 403 is configured to select, as a serving network node for the one of the semi-connected or idle radio connection state of the second set of radio connection states, the serving network node of the connected radio connection state of the first set of radio connection states.

In an embodiment, when an idle radio connection state is established as the one of the first or second sets of radio connection states, the controller 403 is configured to control the transceiver 401, 402 to transmit data to the wireless telecommunications network in the idle radio connection state without establishing an RRC connection.

In an embodiment, one or more of the radio connection states in the first set of radio connection states is associated with a first set of DRX parameters in accordance with the first quality of service (that is, so that the communication characteristics meet those required for the first quality of service). Also, one or more of the radio connection states in the second set of radio connection states is associated with a second set of DRX parameters in accordance with the second quality of service (that is, so that the communication characteristics meet those required for the second quality of service). The controller 403 then controls the transceiver 401, 402 to operate, in combination with the controller, using the one of the first and second sets of DRX parameters associated with the shortest DRX cycle duration.

In an embodiment, the controller 403 is configured to control the transceiver 401, 402 to exchange data with the wireless telecommunications network using the first communications service using a first portion of network resources associated with a first radio access technology (RAT) and to exchange data with the wireless telecommunications network using the second communications service using a second portion of network resources associated with a second radio access technology (RAT). The network resources in the first portion may comprise one or more of a network node and a network slice associated with the first RAT. Similarly, the network resources in the second portion may comprise one or more of a network node and a network slice associated with the second RAT. As previously described, a network slice is a logical collection of network functions for supporting a particular service with particular requirements. More information about network slices may be found in [4], for example. The first and second RATs may be the same RAT, or they may be different.

Figure 4:
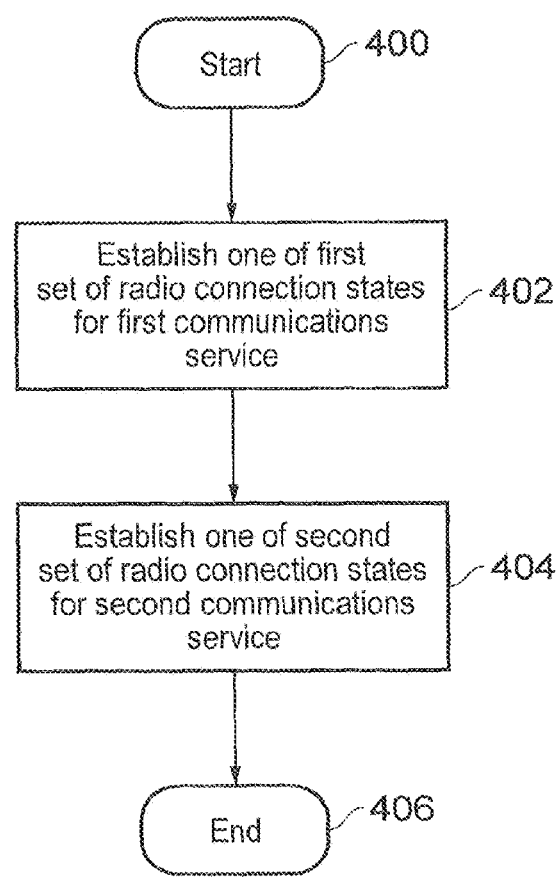
FIG. 4 shows a flow chart schematically illustrating a process according to an embodiment of the present technique.

FIG. 4 shows a flow chart schematically illustrating a process according to an embodiment of the present technique. The process starts at step 400. At steps 402 and 404, the terminal device 104 exchanges data with the network 100 using a first communications service and a second communications service, the first communications service being associated with a first quality of service for exchanging data and the second communications service being associated with a second quality of service for exchanging data. In particular, at step 402, the terminal device 104 establishes one of a first set of radio connection states with the network 100, each radio connection state of the first set of radio connection states defining a mode of the first communications service comprising one or more of transmitting data to, receiving data from or managing an attachment of the terminal device to the network in accordance with the first quality of service. Furthermore, at step 404, the terminal device 104 establishes, independently of the establishment of the one of the first set of radio connection states, one of a second set of radio connection states with the network 100, each radio connection state of the second set of radio connection states defining a mode of the second communications service comprising one or more of transmitting data to, receiving data from or managing an attachment of the terminal device to the network in accordance with the second quality of service. The process then ends at step 406.

Thus, it will be appreciated that the present technique allows independent handling of different services within the same UE. In particular, it allows a single UE to be simultaneously connected to completely different parts of the network (for example, the UE may be connected to an IoT slice of the network to use an IoT service whilst, at the same time, connected, via a different path, to an eMBB network slice to use an eMBB service) and separates the concept of a communications service from that of a device. The present technique thus allows more optimal configuration of a terminal device depending on a plurality of active services in a simple way.

Various features of embodiments of the present technique are defined by the following numbered clauses:
1. A terminal device for use with a wireless telecommunications network, the terminal device comprising:
  a transceiver; and
  a controller configured to control the transceiver to exchange data with the wireless telecommunications network using one of a first communications service and a second communications service, the first communications service being associated with a first quality of service for exchanging data and the second communications service being associated with a second quality of service for exchanging data; wherein
    the controller is configured to control the transceiver to establish one of a first set of radio connection states with the wireless telecommunications network, each radio connection state of the first set of radio connection states defining a mode of the first communications service comprising one or more of transmitting data to, receiving data from or managing an attachment of the terminal device to the wireless telecommunications network in accordance with the first quality of service; and the controller is configured to control the transceiver to establish one of a second set of radio connection states with the wireless telecommunications network, each radio connection state of the second set of radio connection states defining a mode of the second communications service comprising one or more of transmitting data to, receiving data from or managing an attachment of the terminal device to the wireless telecommunications network in accordance with the second quality of service;

wherein the controller is configured to control the transceiver to establish the radio connection state of the first communications service independently of the radio connection state of the second communications service.

2. A terminal device according to clause 1, wherein
each radio connection state in the first set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state, in accordance with the first quality of service; and each radio connection state in the second set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state, in accordance with the second quality of service 3. A terminal device according to clause 2, wherein each radio connection state in the first and second sets of radio connection states is one of:
a connected radio connection state in which a radio resource control (RRC) connection is established with the wireless telecommunications network and the terminal device mobility handling arrangement comprises using a network node handover operation carried out by the wireless telecommunications network;

an idle radio connection state in which no RRC connection is established with the wireless telecommunications network and the terminal device mobility handling arrangement comprises using a network node reselection operation; or a semi-connected radio connection state in which a RRC connection is established with the wireless telecommunications network and the terminal device mobility handling arrangement comprises using a network node reselection operation.

4. A terminal device according to clause 3, wherein the network node reselection operation of one or more of the idle radio connection state and semi-connected radio connection state is carried out by the controller.

5. A terminal device according to clause 3, wherein the controller is configured to control the transceiver to transmit a beacon signal to the wireless telecommunications network, and the wireless telecommunications network is configured to perform the network node reselection operation of one or more of the idle radio connection state and semi-connected radio connection state in accordance with a measured characteristic of the beacon signal indicative of radio channel conditions between the terminal device and one or more network nodes of the wireless telecommunications network.

6. A terminal device according to any one of clauses 3 to 5, wherein each of the first and second sets of radio connection states comprises one of a connected radio connection state and a semi-connected radio connection state, and the controller is configured to control the transceiver to establish a common control plane with the wireless telecommunications network for controlling both the one of the connected or semi-connected radio connection state of the first set of radio connection states and the one of the connected or semi-connected radio connection state of the second set of radio connection states.

7. A terminal device according to any one of clauses 3 to 6, wherein the first set of radio connection states comprises a connected radio connection state and the second set of radio connection states comprises one of a semi-connected or idle radio connection state, wherein the controller is configured to select, as a serving network node for the one of the semi-connected or idle radio connection state of the second set of radio connection states, the serving network node of the connected radio connection state of the first set of radio connection states.

8. A terminal device according to any one of clauses 3 to 7, wherein, when an idle radio connection state is established as the one of the first or second sets of radio connection states, the controller is configured to control the transceiver to transmit data to the wireless telecommunications network in the idle radio connection state without establishing an RRC connection.

9. A terminal device according to any one of clauses 2 to 8, wherein
one or more of the radio connection states in the first set of radio connection states is associated with a first set of DRX parameters in accordance with the first quality of service;

one or more of the radio connection states in the second set of radio connection states is associated with a second set of DRX parameters in accordance with the second quality of service; and the controller is operate to control the transceiver to operate, in combination with the controller, using the one of the first and second sets of DRX parameters associated with the shortest DRX cycle duration.

10. A terminal device according to any preceding clause, wherein the controller is configured to control the transceiver to exchange data with the wireless telecommunications network using the first communications service using a first portion of network resources associated with a first radio access technology (RAT) and to exchange data with the wireless telecommunications network using the second communications service using a second portion of network resources associated with a second radio access technology (RAT).

11. A terminal device according to clause 10, wherein the network resources in the first portion comprise one or more of a network node and a network slice associated with the first RAT and the network resources in the second portion comprise one or more of a network node and a network slice associated with the second RAT.

12. A terminal device according to clause 10 or 11, wherein the first RAT is different to the second RAT.

13. Infrastructure equipment for use with a wireless telecommunications network, the infrastructure equipment comprising:
   a transceiver; and
   a controller configured to control the transceiver to exchange data with a terminal device of the wireless telecommunications network using one of a first communications service and a second communications service, the first communications service being associated with a first quality of service for exchanging data and the second communications service being associated with a second quality of service for exchanging data; wherein
   the controller is configured to control the transceiver to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service; and
   the controller is configured to control the transceiver to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service;
   wherein the controller is configured to control the transceiver to establish the radio connection state of the first communications service independently of the radio connection state of the second communications service.

14. Infrastructure equipment according to clause 13, wherein
   each radio connection state in the first set of radio connection states is associated with one or more of a radio resource control (RRC) state, a set of discontinuous reception (DRX) parameters, a terminal device mobility handling arrangement, and a control signalling procedure for one or more of establishing a radio connection with the terminal device, exchanging data with the terminal device and handling a transition to a different radio connection state, in accordance with the first quality of service; and
   each radio connection state in the second set of radio connection states is associated with one or more of a radio resource control (RRC) state, a set of discontinuous reception (DRX) parameters, a terminal device mobility handling arrangement, and a control signalling procedure for one or more of establishing a radio connection with the terminal device, exchanging data with the terminal device and handling a transition to a different radio connection state, in accordance with the second quality of service 15. Infrastructure equipment according to clause 14, wherein each radio connection state in the first and second sets of radio connection states is one of:
   a connected radio connection state in which a radio resource control (RRC) connection is established with the terminal device and the terminal device mobility handling arrangement comprises using a network node handover operation carried out by the wireless telecommunications network;
   an idle radio connection state in which no RRC connection is established with the terminal device and the terminal device mobility handling arrangement comprises using a network node reselection operation; or
   a semi-connected radio connection state in which a RRC connection is established with the terminal device and the terminal device mobility handling arrangement comprises using a network node reselection operation.

16. Infrastructure equipment according to clause 15, wherein the network node reselection operation of one or more of the idle radio connection state and semi-connected radio connection state is carried out by the terminal device.

17. Infrastructure equipment according to clause 15, wherein the controller is configured to control the transceiver to receive a beacon signal from the terminal device, and the controller is configured to perform the network node reselection operation of one or more of the idle radio connection state and semi-connected radio connection state in accordance with a measured characteristic of the beacon signal indicative of radio channel conditions between the terminal device and the infrastructure equipment.

18. Infrastructure equipment according to any one of clauses 15 to 17, wherein each of the first and second sets of radio connection states comprises one of a connected radio connection state and a semi-connected radio connection state, and the controller is configured to control the transceiver to establish a common control plane with the terminal device for controlling both the one of the connected or semi-connected radio connection state of the first set of radio connection states and the one of the connected or semi-connected radio connection state of the second set of radio connection states.

19. Infrastructure equipment according to any one of clauses 15 to 18, wherein, when an idle radio connection state is established as the one of the first or second sets of radio connection states, the controller is configured to control the transceiver to receive data from the wireless telecommunications network in the idle radio connection state without establishing an RRC connection.

20. Infrastructure equipment according to any one of clauses 14 to 19, wherein
   one or more of the radio connection states in the first set of radio connection states is associated with a first set of DRX parameters in accordance with the first quality of service;
   one or more of the radio connection states in the second set of radio connection states is associated with a second set of DRX parameters in accordance with the second quality of service; and
   the controller is operate to control the transceiver to operate, in combination with the controller, using the one of the first and second sets of DRX parameters associated with the shortest DRX cycle duration.

21. Infrastructure equipment according to any one of clauses 13 to 20, wherein the controller is configured to control the transceiver to exchange data with the terminal device using the first communications service using a first portion of network resources associated with a first radio access technology (RAT) and to exchange data with the terminal device using the second communications service using a second portion of network resources associated with a second radio access technology (RAT).

22. Infrastructure equipment according to clause 21, wherein the network resources in the first portion comprise a network slice associated with the first RAT and the network resources in the second portion comprise a network slice associated with the second RAT.

23. Infrastructure equipment according to clause 21 or 22, wherein the first RAT is different to the second RAT.

24. A wireless telecommunications network comprising:
   a terminal device;
   a plurality of network nodes each configured to exchange data with the terminal device; and
   a controller configured to control one or more of the network nodes to exchange data with the terminal device using one of a first communications service and a second communications service, the first communications service being associated with a first quality of service for exchanging data and the second communications service being associated with a second quality of service for exchanging data; wherein
   the controller is configured to control a first one of the one or more network nodes to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service; and
   the controller is configured to control a second one of the one or more network nodes to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service;
   wherein the controller is configured to control the first network node to establish the radio connection state of the first communications service independently of the establishment of the radio connection state of the second communications service by the second network node.

25. A wireless telecommunications network according to clause 24, wherein
   each radio connection state in the first set of radio connection states is associated with one or more of a radio resource control (RRC) state, a set of discontinuous reception (DRX) parameters, a terminal device mobility handling arrangement, and a control signalling procedure for one or more of establishing a radio connection with the terminal device, exchanging data with the terminal device and handling a transition to a different radio connection state, in accordance with the first quality of service; and
   each radio connection state in the second set of radio connection states is associated with one or more of a radio resource control (RRC) state, a set of discontinuous reception (DRX) parameters, a terminal device mobility handling arrangement, and a control signalling procedure for one or more of establishing a radio connection with the terminal device, exchanging data with the terminal device and handling a transition to a different radio connection state, in accordance with the second quality of service.

26. A wireless telecommunications network according to clause 25, wherein each radio connection state in the first and second sets of radio connection states is one of:
   a connected radio connection state in which a radio resource control (RRC) connection is established with the terminal device and the terminal device mobility handling arrangement comprises using a network node handover operation carried out by the wireless telecommunications network;
   an idle radio connection state in which no RRC connection is established with the terminal device and the terminal device mobility handling arrangement comprises using a network node reselection operation; or
   a semi-connected radio connection state in which a RRC connection is established with the terminal device and the terminal device mobility handling arrangement comprises using a network node reselection operation.

27. A wireless telecommunications network according to clause 26, wherein the network node reselection operation of one or more of the idle radio connection state and semi-connected radio connection state is carried out by the terminal device.

28. A wireless telecommunications network according to clause 26, wherein the controller is configured to control the one or more network nodes to receive a beacon signal from the terminal device, and the controller is configured to perform the network node reselection operation of one or more of the idle radio connection state and semi-connected radio connection state in accordance with a measured characteristic of the beacon signal indicative of radio channel conditions between the terminal device and the one or more network nodes.

29. A wireless telecommunications network according to any one of clauses 26 to 28, wherein each of the first and second sets of radio connection states comprises one of a connected radio connection state and a semi-connected radio connection state, and the controller is configured to control the one or more network nodes to establish a common control plane with the terminal device for controlling both the one of the connected or semi-connected radio connection state of the first set of radio connection states and the one of the connected or semi-connected radio connection state of the second set of radio connection states.

30. A wireless telecommunications network according to any one of clauses 26 to 29, wherein, when an idle radio connection state is established as the one of the first or second sets of radio connection states, the controller is configured to control the one or more network nodes to receive data from the wireless telecommunications network in the idle radio connection state without establishing an RRC connection.

31. A wireless telecommunications network according to any one of clauses 25 to 30, wherein
   one or more of the radio connection states in the first set of radio connection states is associated with a first set of DRX parameters in accordance with the first quality of service;
   one or more of the radio connection states in the second set of radio connection states is associated with a second set of DRX parameters in accordance with the second quality of service; and
   the controller is operate to control the one or more network nodes to operate, in combination with the controller, using the one of the first and second sets of DRX parameters associated with the shortest DRX cycle duration.

32. A wireless telecommunications network according to any one of clauses 24 to 31, wherein the controller is configured to control the one or more network nodes to exchange data with the terminal device using the first communications service using a first portion of network resources associated with a first radio access technology (RAT) and to exchange data with the terminal device using the second communications service using a second portion of network resources associated with a second radio access technology (RAT).

33. A terminal device according to clause 32, wherein the network resources in the first portion comprise one or more of a network node and a network slice associated with the first RAT and the network resources in the second portion comprise one or more of a network node and a network slice associated with the second RAT.

34. A wireless telecommunications network according to clause 32 or 33, wherein the first RAT is different to the second RAT.

35. A method of operating a terminal device for use with a wireless telecommunications network, the method comprising:

controlling a transceiver of the terminal device to exchange data with the wireless telecommunications network using one of a first communications service and a second communications service, the first communications service being associated with a first quality of service for exchanging data and the second communications service being associated with a second quality of service for exchanging data; wherein the transceiver is controlled to establish one of a first set of radio connection states with the wireless telecommunications network, each radio connection state of the first set of radio connection states defining a mode of the first communications service comprising one or more of transmitting data to, receiving data from or managing an attachment of the terminal device to the wireless telecommunications network in accordance with the first quality of service; and the transceiver is controlled to establish one of a second set of radio connection states with the wireless telecommunications network, each radio connection state of the second set of radio connection states defining a mode of the second communications service comprising one or more of transmitting data to, receiving data from or managing an attachment of the terminal device to the wireless telecommunications network in accordance with the second quality of service;

wherein the transceiver is controlled to establish the radio connection state of the first communications service independently of the radio connection state of the second communications service.

36. A method of operating infrastructure equipment for use with a wireless telecommunications network, the method comprising:

controlling a transceiver of the infrastructure equipment to exchange data with a terminal device of the wireless telecommunications network using one of a first communications service and a second communications service, the first communications service being associated with a first quality of service for exchanging data and the second communications service being associated with a second quality of service for exchanging data; wherein the transceiver is controlled to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service; and the transceiver is controlled to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service;

wherein the transceiver is controlled to establish the radio connection state of the first communications service independently of the radio connection state of the second communications service.

37. A method of operating a wireless telecommunications network a terminal device and a plurality of network nodes each configured to exchange data with the terminal device, the method comprising:

controlling one or more of the network nodes to exchange data with the terminal device using one of a first communications service and a second communications service, the first communications service being associated with a first quality of service for exchanging data and the second communications service being associated with a second quality of service for exchanging data; wherein a first one of the one or more network nodes is controlled to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service; and a second one of the one or more network nodes is controlled to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service;

wherein the first network node is controlled to establish the radio connection state of the first communications service independently of the establishment of the radio connection state of the second communications service by the second network node.

38. Integrated circuitry for a terminal device for use with a wireless telecommunications network, the integrated circuitry comprising:

a transceiver element; and a controller element configured to control the transceiver element to exchange data with the wireless telecommunications network using one of a first communications service and a second communications service, the first communications service being associated with a first quality of service for exchanging data and the second communications service being associated with a second quality of service for exchanging data; wherein the controller element is configured to control the transceiver element to establish one of a first set of radio connection states with the wireless telecommunications network, each radio connection state of the first set of radio connection states defining a mode of the first communications service comprising one or more of transmitting data to, receiving data from or managing an attachment of the terminal device to the wireless telecommunications network in accordance with the first quality of service; and the controller element is configured to control the transceiver element to establish one of a second set of radio connection states with the wireless telecommunications network, each radio connection state of the second set of radio connection states defining a mode of the second communications service comprising one or more of transmitting data to, receiving data from or managing an attachment of the terminal device to the wireless telecommunications network in accordance with the second quality of service;

wherein the controller element is configured to control the transceiver element to establish the radio connection state of the first communications service independently of the radio connection state of the second communications service.

39. Integrated circuitry for infrastructure equipment for use with a wireless telecommunications network, the integrated circuitry comprising:

a transceiver element; and a controller element configured to control the transceiver element to exchange data with a terminal device of the wireless telecommunications network using one of a first communications service and a second communications service, the first communications service being associated with a first quality of service for exchanging data and the second communications service being associated with a second quality of service for exchanging data; wherein the controller element is configured to control the transceiver element to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service; and the controller element is configured to control the transceiver element to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service;

wherein the controller element is configured to control the transceiver element to establish the radio connection state of the first communications service independently of the radio connection state of the second communications service.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] 3GPP TSG RAN Meeting #71 (Göteborg, Sweden, 7-10 Mar. 2016) RP-160540 "Signalling reduction to enable light connection for LTE"

[2] 3GPP TSG RAN Meeting #71 (Göteborg, Sweden, 7-10 Mar. 2016) RP-160671 "Study on NR New Radio Access Technology"

[3] Holma H. and Toskala A, "LTE for UMTS OFDMA and SC-FDMA based radio access", John Wiley and Sons, 2009

[4] Ericsson White Paper Uen 284 23-3244 January 2015 "5G Systems: Enabling Industry and Society Transformation" http://www.ericsson.com/res/docs/whitepapers/what-is-a-5g-system.pdf

The invention claimed is:

1. A terminal device for use with a wireless telecommunications network, the terminal device comprising:

a transceiver; and a controller configured to control the transceiver to:

exchange data with the wireless telecommunications network using both of a first communications service and a second communications service, the first communications service being associated with a first quality of service for exchanging data, and the second communications service being associated with a second quality of service for exchanging data different from the first quality of service;

establish one of a first set of radio connection states with the wireless telecommunications network, each radio connection state of the first set of radio connection states defining a mode of the first communications service comprising one or more of transmitting data to, receiving data from or managing an attachment of the terminal device to the wireless telecommunications network in accordance with the first quality of service;

establish one of a second set of radio connection states with the wireless telecommunications network, each radio connection state of the second set of radio connection states defining a mode of the second communications service comprising one or more of transmitting data to, receiving data from or managing an attachment of the terminal device to the wireless telecommunications network in accordance with the second quality of service; and establish a first radio connection state of the first communications service according to the mode of the first communications service independently of establishment of a second connection state of the second communications service according to the mode of the second communications service, wherein handling of the first set of radio connection states for the first communication service uses a first portion of network resources, handling of the second set of radio connection states for the second communication service uses a second portion of the network resources different from the first portion, and the handling of the first set of radio connection states for the first communication service at least partially overlaps in time the handling of the second set of radio connection states for the second communication service.

2. The terminal device according to claim 1, wherein
the transceiver is implemented in transceiver circuitry and the controller is implemented in control circuitry, each radio connection state in the first set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state, in accordance with the first quality of service, and each radio connection state in the second set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state, in accordance with the second quality of service.

3. The terminal device according to claim 2, wherein each radio connection state in the first and second sets of radio connection states is one of:

a connected radio connection state in which a radio resource control (RRC) connection is established with the wireless telecommunications network and the terminal device mobility handling arrangement comprises using a network node handover operation carried out by the wireless telecommunications network;

an idle radio connection state in which no RRC connection is established with the wireless telecommunications network and the terminal device mobility handling arrangement comprises using a network node reselection operation; or a semi-connected radio connection state in which a RRC connection is established with the wireless telecommunications network and the terminal device mobility handling arrangement comprises using a network node reselection operation.

4. The terminal device according to claim 3, wherein the network node reselection operation of one or more of the idle radio connection state and semi-connected radio connection state is carried out by the controller.

5. The terminal device according to claim 3, wherein the controller is configured to control the transceiver to transmit a beacon signal to the wireless telecommunications network, and the wireless telecommunications network is configured to perform the network node reselection operation of one or more of the idle radio connection state and semi-connected radio connection state in accordance with a measured characteristic of the beacon signal indicative of radio channel conditions between the terminal device and one or more network nodes of the wireless telecommunications network.

6. The terminal device according to claim 3, wherein each of the first and second sets of radio connection states comprises one of a connected radio connection state and a semi-connected radio connection state, and the controller is configured to control the transceiver to establish a common control plane with the wireless telecommunications network for controlling both the one of the connected or semi-connected radio connection state of the first set of radio connection states and the one of the connected or semi-connected radio connection state of the second set of radio connection states.

7. The terminal device according to claim 3, wherein the first set of radio connection states comprises a connected radio connection state and the second set of radio connection states comprises one of a semi-connected or idle radio connection state, wherein the controller is configured to select, as a sewing network node for the one of the semi-connected or idle radio connection state of the second set of radio connection states, the serving network node of the connected radio connection state of the first set of radio connection states.

8. The terminal device according to claim 3, wherein, when an idle radio connection state is established as the one of the first or second sets of radio connection states, the controller is configured to control the transceiver to transmit data to the wireless telecommunications network in the idle radio connection state without establishing an RRC connection.

9. The terminal device according to claim 2, wherein
one or more of the radio connection states in the first set of radio connection states is associated with a first set of DRX parameters in accordance with the first quality of service, one or more of the radio connection states in the second set of radio connection states is associated with a second set of DRX parameters in accordance with the second quality of service, and the controller is configured to control the transceiver to operate, in combination with the controller, using the one of the first and second sets of DRX parameters associated with the shortest DRX cycle duration.

10. The terminal device according to claim 1, wherein the controller is configured to control the transceiver to exchange data with the wireless telecommunications network using the first communications service using the first portion of network resources, which is associated with a first radio access technology (RAT), and to exchange data with the wireless telecommunications network using the second communications service using the second portion of network resources, which is associated with a second radio access technology (RAT).

11. The terminal device according to claim 10, wherein the network resources in the first portion comprise one or more of a network node and a network slice associated with the first RAT and the network resources in the second portion comprise one or more of a network node and a network slice associated with the second RAT.

12. The terminal device according to claim 10, wherein the first RAT is different to the second RAT.

13. A method of operating a terminal device for use with a wireless telecommunications network, the method comprising:
controlling a transceiver of the terminal device to exchange data with the wireless telecommunications network using both of a first communications service and a second communications service, the first communications service being associated with a first quality of service for exchanging data, and the second communications service being associated with a second quality of service for exchanging data different from the first quality of service;
controlling the transceiver to establish one of a first set of radio connection states with the wireless telecommunications network, each radio connection state of the first set of radio connection states defining a mode of the first communications service comprising one or more of transmitting data to, receiving data from or managing an attachment of the terminal device to the wireless telecommunications network in accordance with the first quality of service;
controlling the transceiver to establish one of a second set of radio connection states with the wireless telecommunications network, each radio connection state of the second set of radio connection states defining a mode of the second communications service comprising one or more of transmitting data to, receiving data from or managing an attachment of the terminal device to the wireless telecommunications network in accordance with the second quality of service; and
controlling the transceiver to establish a first radio connection state of the first communications service independently of a second radio connection state of the second communications service,
wherein handling of the first set of radio connection states for the first communication service uses a first portion of network resources, handling of the second set of radio connection states for the second communication service uses a second portion of the network resources different from the first portion, and the handling of the first set of radio connection states for the first communication service at least partially overlaps in time the handling of the second set of radio connection states for the second communication service.

14. The method according to claim 13, wherein said controlling the transceiver to establish the first radio connection state of the first communications service independently of the second radio connection state of the second communications service is according to the mode of the first communications service and established independently of establishment of a second connection state of the second communications service according to the mode of the second communications service.

15. The method according to claim 13, wherein
each radio connection state in the first set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state, in accordance with the first quality of service, and
each radio connection state in the second set of radio connection states is associated with one or more of a radio resource control (RRC) state, a set of discontinuous reception (DRX) parameters, a terminal device mobility handling arrangement, and a control signalling procedure for one or more of establishing a radio connection with the wireless telecommunications network, exchanging data with the wireless telecommunications network and handling a transition to a different radio connection state, in accordance with the second quality of service.

16. The method according to claim 13, wherein
one or more of the radio connection states in the first set of radio connection states is associated with a first set of DRX parameters in accordance with the first quality of service;
one or more of the radio connection states in the second set of radio connection states is associated with a second set of DRX parameters in accordance with the second quality of service, and
the controller is configured to control the transceiver to operate, in combination with the controller, using the one of the first and second sets of DRX parameters associated with the shortest DRX cycle duration.

17. The method according to claim 13, wherein
said controlling the transceiver to exchange data with the wireless telecommunications network using the first communications service is performed using the first portion of network resources, which is associated with a first radio access technology (RAT), and
said controlling the transceiver to exchange data with the wireless telecommunications network using the second communications service is performed using a second portion of network resources associated with a second radio access technology (RAT).

18. The method according to claim 17, wherein
the network resources in the first portion comprise one or more of a network node and a network slice associated with the first RAT and the network resources in the second portion comprise one or more of a network node and a network slice associated with the second RAT, and
the first RAT is different to the second RAT.

19. A method of operating infrastructure equipment for use with a wireless telecommunications network, the method comprising:
controlling a transceiver of the infrastructure equipment to exchange data with a terminal device of the wireless telecommunications network using both of a first communications service and a second communications service, the first communications service being associated with a first quality of service for exchanging data, and the second communications service being associated with a second quality of service for exchanging data different from the first quality of service;

controlling the transceiver to establish one of a first set of radio connection states with the terminal device, each radio connection state of the first set of radio connection states defining a mode of the first communications service comprising one or more of transmitting data to the terminal device, receiving data from the terminal device or managing an attachment of the terminal device to the wireless telecommunications network in accordance with the first quality of service;

controlling the transceiver to establish one of a second set of radio connection states with the terminal device, each radio connection state of the second set of radio connection states defining a mode of the second communications service comprising one or more of transmitting data to the terminal device, receiving data from the terminal device or managing an attachment of the terminal device to the wireless telecommunications network in accordance with the second quality of service; and controlling the transceiver to establish a first radio connection state of the first communications service independently of a second radio connection state of the second communications service, wherein handling of the first set of radio connection states for the first communication service uses a first portion of network resources, handling of the second set of radio connection states for the second communication service uses a second portion of the network resources different from the first portion, and the handling of the first set of radio connection states for the first communication service at least partially overlaps in time the handling of the second set of radio connection states for the second communication service.

* * * * *